Aug. 16, 1938.  R. CHILTON  2,127,464
PLANETARY REDUCTION GEAR
Filed Nov. 3, 1937
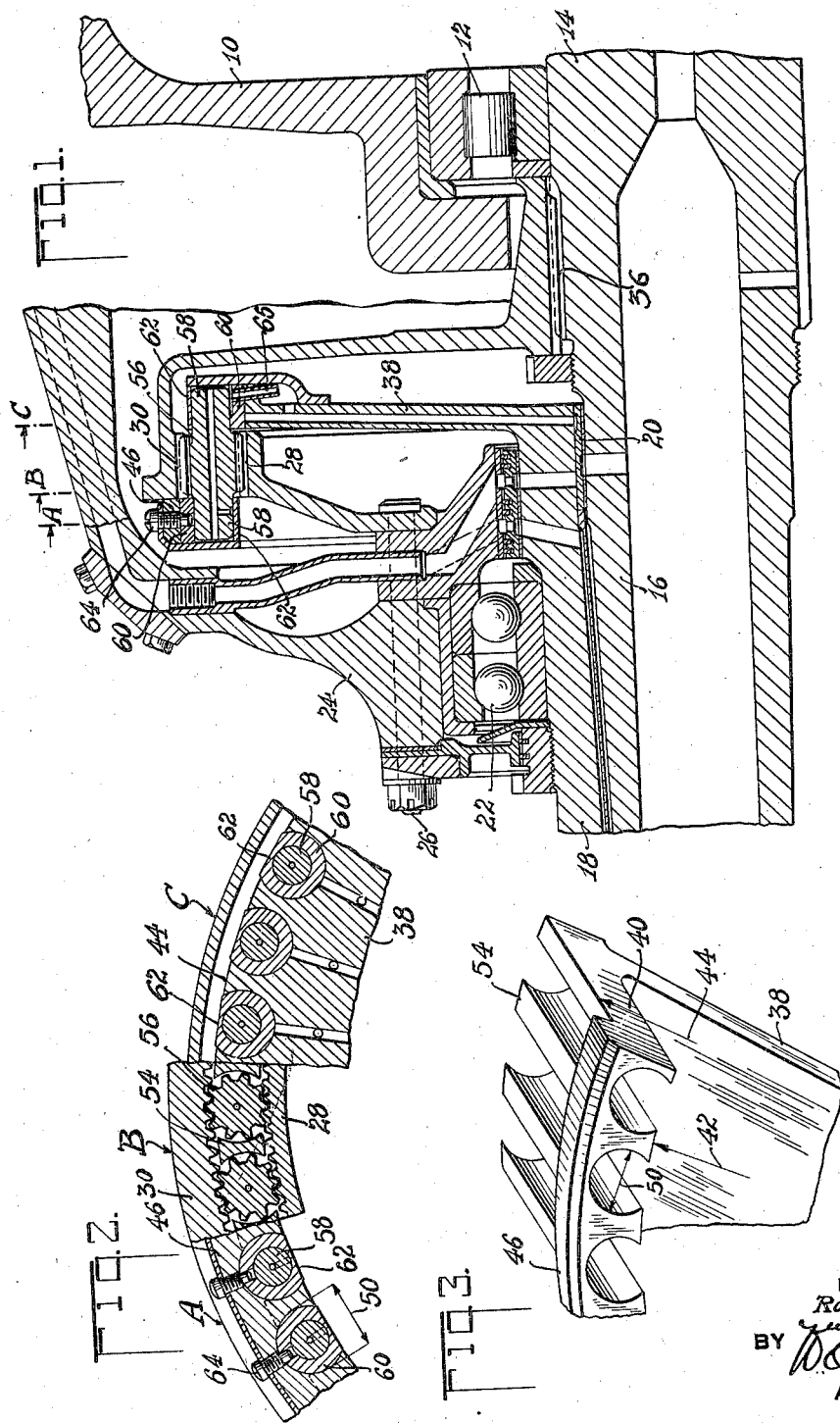
INVENTOR
ROLAND CHILTON
BY
ATTORNEY Patented Aug. 16, 1938

2,127,464

UNITED STATES PATENT OFFICE 2,127,464

PLANETARY REDUCTION GEAR

Roland Chilton, Ridgewood, N. J., assignor, by mesne assignments, to Wright Aeronautical Corporation, Paterson, N. J., a corporation of New York Application November 3, 1937, Serial No. 172,560

5 Claims. (Cl. 74—305)

This invention relates to reduction gears, the embodiment of the drawing being designed for a large radial aircraft engine.

In certain respects, the invention comprises improvements on my copending application, Serial No. 152,491, wherein the desirability of using a very large number of planet pinions is taught.

In the past, it has been assumed that the simple spur planetary reduction gears were unsuitable for reduction ratios near 2:1 because of the small pinion size needed. The small pinion sizes, however, have one very great advantage, i. e., they permit the use of a relatively great number of pinions, the capacity of a gear with any specific size of sun gear and ring gear being, of course, proportional to the number of pinions that can be accommodated.

In my copending application, a design permitting the use of twenty pinions is shown, and this number approaches the limit for the construction there shown wherein the pinions are hollow to run on journals projecting from a supporting member. The present invention provides a novel planet carrier construction wherein journals extend on either side of virtually solid pinions, whereby the pinion diameter may be reduced and a much greater number of pinions accordingly used, the design in the drawing showing thirty-six pinions. These extremely small pinions, however, introduce new problems in the design of the planet carrier member and this invention, accordingly, provides a novel structure suited to the rigid support of a large number of small pinions with a minimum inter-pinion spacing, while affording adequate rigidity against deflection at the outboard pinion bearings.

Other objects and advantages will be obvious from, or will be pointed out in, the following description, with reference to the drawing, in which:

Fig. 1 is a fragmentary axial section through a gear according to the invention;

Fig. 2 comprises three fragmentary sections on the line A, B and C, respectively, of Fig. 1, and Fig. 3 is a fragmentary perspective view of the pinion carrier structure.

In the drawing, 10 designates a portion of a conventional crankcase having a bearing 12 in which is carried a conventional crankshaft 14 having an extension 16, on which a hollow propeller shaft 18 is carried on the usual bushings, one of which is indicated at 20. The propeller shaft is equipped with the usual thrust bearing 22 secured in the engine nose or gear housing 24 by bolts 26 which also serve to secure a sun gear 28. The housing 24 is rigid with the crankcase 10. Surrounding the sun gear 28 is a ring gear 30 splined to the crankshaft at 36.

Integral with the propeller shaft 18 is a pinion carrying member comprising a back plate 38, and a projecting annular member 40, better seen in the perspective view of Fig. 3. The inside diameter 42 of the annulus 40 is of a diameter to just clear the tops of the teeth of the sun gear 28 and the outer diameter 44, rearward of a flange 46, is similarly turned to just clear the teeth of the ring gear 30, leaving the integral reinforcing flange 46 disposed outside the ring gear 30. The projecting annulus 40 is then bored for each pinion to a diameter 50 just sufficient to clear the pinion teeth, these bores being open, on the inner and outer sides, intermediate the rim 46 and the back plate 38.

It will be seen that these simple boring and turning operations define concave sided stumps 54 intermediate each pinion pocket, these stumps being integrally united at their extended ends by the rim 46, each extending integrally from the back plate 38, forming an integral structure of great rigidity by simple machining operations.

Pinions 56, having integral journals 58 at each end are disposed in the pockets 50, the journals of the pinions being supported by relatively thick bushiings 60, these being flatted, as shown at 62, to permit withdrawal of the carrier 38 and the sun gear 28 without dismantling the bushings which are located in the carrier as by screws 64, and oil tubes 65. The large diameter of the bushings 60 permits assembly of the pinions endways into the integral cage structure.

In the prior art double-sided cages of this general type have been built up, the outer portion being secured to an inner rim such as 46, of a back plate 38, by bolts. This construction, however, involves much wider spacing of the pinions and therefore reduces the total number of pinions that can be used as compared to the integral structure of this invention.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a reduction gear, in combination, a sun gear, an annular gear, pinions having integral journals at either end, and meshed with said gears, bearing bushings for said journals, a planet carrier comprising a back plate and an annular member extending therefrom between said gears, the extended end being provided with a stiffening flange, said annulus being bored to provide pockets for said pinions and seats for said bushings.

2. A planet pinion carrier including, in combination, a back plate, a plurality of concave-sided stumps extending integrally from said back plate to define planet pockets, and a rim integrally uniting the extended ends of said stumps.

3. A planet carrier for a gear having internal and external gears meshed with the planets, said carrier comprising a front rim of larger diameter than the internal diameter of said ring gear teeth and having stumps integrally united with said rim, said stumps being formed by boring adjacent cylindrical pockets to accommodate the planets and by removing sufficient material on the outside to clear the ring gear teeth and on the inside to clear said sun gear teeth.

4. A planet carrier for a gear having planet pinions and sun and ring gears meshed therewith comprising an annular member having a front rim element of greater diameter than the inner diameter of said ring gear teeth and integrally connected therewith by stumps clearing said ring gear teeth and having concave sides defining pinion pockets, the inner diameter of said flange and stubs being sufficient to clear the tops of said sun gear teeth, the entire carrier structure being formed integrally from a single piece of material.

5. A planetary gear including planets having front and rear journals on either sides of their teeth, bushings respectively engaging the front and rear journals, one set of bushings at least being slightly greater in outside diameter than said teeth, a planet carrier having circumferentially spaced bores fitted to said bushings and clearing said pinion teeth, the front and back bores being open on their inner and outer sides respectively and all said bores being formed in a single integral piece of material.

ROLAND CHILTON.